United States Patent
Watson (10) Patent No.: US 11,101,875 B2
(45) Date of Patent: Aug. 24, 2021

(54) SELECTABLE GEOLOCATION FOR VEHICLE ENTERTAINMENT SYSTEMS

(71) Applicant: Panasonic Avionics Corporation, Lake Forest, CA (US)

(72) Inventor: Philip Watson, Lake Forest, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 35 days.

(21) Appl. No.: 16/671,635

(22) Filed: Nov. 1, 2019

(65) Prior Publication Data
US 2021/0135746 A1   May 6, 2021

(51) Int. Cl.
| | |
|---|---|
| H04N 21/414 | (2011.01) |
| H04B 7/185 | (2006.01) |
| H04W 4/02 | (2018.01) |
| B64D 11/00 | (2006.01) |

(52) U.S. Cl.
CPC ..... *H04B 7/18508* (2013.01); *B64D 11/0015* (2013.01); *H04N 21/414* (2013.01); *H04W 4/025* (2013.01)

(58) Field of Classification Search
CPC .............. H04B 7/18508; H04W 4/025; B64D 11/0015; H04N 21/414; H04N 21/2146; H04N 21/25841; H04N 21/41422
USPC .......................................................... 725/76
See application file for complete search history.

(56) References Cited

U.S. PATENT DOCUMENTS

| | | | |
|---|---|---|---|
| 8,489,685 B2* | 7/2013 | Bharadhwaj | H04L 67/327 709/205 |
| 10,033,627 B1 | 7/2018 | Howard et al. | |
| 10,355,773 B1* | 7/2019 | Awad | H04L 61/2539 |
| 2003/0233658 A1 | 12/2003 | Keen et al. | |
| 2018/0103413 A1 | 4/2018 | Hosey et al. | |
| 2019/0079298 A1* | 3/2019 | Shoji | H04N 21/8186 |
| 2019/0130616 A1 | 5/2019 | Charlton et al. | |
| 2020/0084303 A1* | 3/2020 | Liu | H04L 67/18 |

OTHER PUBLICATIONS

Patkar, M., How to Watch Everything on Nettlix in Any Country Internationally, Make Use of, available at https://www.makeuseof.com/tag/watch-everything-netflix-matter-live/, Nov. 15, 2018.

* cited by examiner

*Primary Examiner* — Nnenna N Ekpo
(74) *Attorney, Agent, or Firm* — Perkins Coie LLP (57) ABSTRACT

Vehicle entertainment systems in commercial passenger vehicles can provide passengers with entertainment options that are based at least in part on geolocation information selected by the passengers. For example, based on a passenger's selection of a home country to which the passenger belongs, the vehicle entertainment system may route data traffic comprising the passenger's entertainment selections via a point of presence (PoP) device located in the selected home country. The vehicle entertainment system may also group data traffic for passengers that have selected the same home country so that the vehicle entertainment system can more efficiently use network resources as the commercial passenger vehicle travels to its destination.

20 Claims, 6 Drawing Sheets

SELECTABLE GEOLOCATION FOR VEHICLE ENTERTAINMENT SYSTEMS

TECHNICAL FIELD

This document is directed generally to enabling passengers in commercial passenger vehicles to select geolocation for providing Internet content.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes vehicle entertainment systems for commercial passenger vehicles, where the vehicle entertainment systems can provide passengers with entertainment options that are based at least in part on geolocation information selected by the passengers. For example, based on a passenger's selection of a home country to which the passenger belongs, the vehicle entertainment system may route data traffic comprising the passenger's entertainment selections via a point of presence (PoP) device located in the selected home country. Thus, the described vehicle entertainment systems can enable passengers to stream Internet content via the Internet to the vehicle entertainment system of the commercial passenger vehicle where the Internet content may be licensed within or associated with the passengers' home countries.

An exemplary system for routing packets from commercial passenger vehicle is disclosed. The system comprises an edge server located in the commercial passenger vehicle, the edge server configured to perform a first method comprising receiving a message from a passenger device located within the commercial passenger vehicle, where the message indicates a geographic region selected via the passenger device, receiving a packet that indicates that an Internet content is requested by the passenger device, where the packet comprises a first identifier that identifies the Internet content, including in the packet a second identifier associated with the geographic region, and transmitting the packet to a ground server located in a fixed location on a ground, where the ground server is configured to perform a second method by sending the packet to a point of presence (POP) device associated with the geographic region indicated by the second identifier.

In some embodiments, prior to the receiving of the message, the edge server is configured to perform the first method that further comprises receiving a passenger manifest that includes names and addresses of passengers on the commercial passenger vehicle, determining home countries to which the passengers belong based on the addresses of the passengers, and sending a second message to the passenger device, where the second message instruct the passenger device to limit geographic region selection options to the home country to which a passenger operating the passenger device belongs, and where the geographic region indicated in the message is the home country selected via the passenger device.

In some embodiments, the edge server is configured to perform the first method that further comprises determining, after receiving the message, that the passenger device has exceeded a limit for a total number of geographic region selections allowed for the passenger device, in response to the determining that the total number of geographic region selections has been exceeded: transmitting, to the passenger device, a second message that is displayed on the passenger device, where the displayed second message indicates that the limit for the total number of geographic region selections allowed has been exceeded, and where the second message prevents the passenger device to perform additional geographic region selections.

In some embodiments, the edge server is configured to perform the first method that further comprises receiving from the ground server the Internet content, and transmitting the Internet content to the passenger device. In some embodiments, the ground server is configured to perform the second method further comprising determining an identifier of the POP device associated with the geographic region based on the second identifier, where the identifier of the POP device is determined from a database that stores the identifier of the POP device and the second identifier associated with the identifier of the POP device. In some embodiments, the second identifier is included in a header of the packet. In some embodiments, the second identifier is further associated with a virtual local area network (VLAN) operated in the commercial passenger vehicle. In some embodiments, the geographic region includes a country. In some embodiments, the second identifier is a country code or a geographic region code.

In some embodiments, the edge server is configured to perform the first method that further comprises receiving a second message from a second passenger device that indicates that a passenger selected a fastest routing option, where the fastest routing option configures the ground server to route data associated with the second passenger device of the passenger to a second POP device that is closest to the ground server, receiving a second packet that indicates that a second Internet content is requested by the second passenger device, where the second packet comprises a third identifier that identifies the second Internet content, including in the second packet a fourth identifier associated with the fastest routing option, and transmitting the second packet to a ground server, where the ground server is further configured to perform the second method by sending, based on the fourth identifier, the second packet to the second POP device. In some embodiments, the edge server is configured to perform the first method that further comprises receiving the second Internet content from the ground server, and transmitting the second Internet content to the second passenger device.

An exemplary method implemented by an edge server in a commercial passenger vehicle, comprises receiving a message from a passenger device located within the commercial passenger vehicle, where the message indicates a geographic region selected via the passenger device, receiving a packet that indicates that an Internet content is requested by the passenger device, where the packet comprises a first identifier that identifies the Internet content, including in the packet a second identifier associated with the geographic region, and transmitting the packet to a ground server located in a fixed location on a ground, where the ground server is configured to send the packet to a point of presence (POP) device associated with the geographic region indicated by the second identifier.

In yet another exemplary aspect, the above-described methods are embodied in the form of processor-executable code and stored in a non-transitory computer-readable storage medium. The code included in the non-transitory computer-readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Many Internet-based streaming services have geographically restrictive licensing on their Internet content (e.g., audio, video), so that certain Internet content may only be available to stream to customers located within a country. Most of these streaming services use geolocation mechanisms to identify a location from where a customer's request originates. Thus, if the customer of a streaming service travels to another country and requests Internet content from another country, the streaming services often reject such requests. In such scenarios, the streaming service may send a message to the customer's user device where the message states that "due to content licensing rights, the content you are attempting to view is not permitted in the region where you are located." Such scenarios present technical problems for passengers travel to countries or regions different from their home country.

A geographically restrictive licensing scheme has led to several technical problems with conventional vehicle entertainment systems in commercial passenger vehicles (e.g., commercial aircrafts or cruise ships). In one example, conventional vehicle entertainment systems send Internet content related data traffic via a communication provider's satellite network to a ground Internet, typically via either a single fixed point, or sometimes via the "closest" of multiple internet point of presence (POP) device connections. As a result, the streaming service providers treat Internet content related data traffic from this network as if it came from the country in which the POP device is located.

In another example, while a single fixed satellite subscriber may be able to negotiate a desirable POP for its Internet connection, each passenger on a commercial passenger vehicle is subject to the one that the commercial passenger vehicle selects. For example, an airline may select a home country and therefore a location of the POP device where its headquarters is located. Any of the two example scenarios provided above can disable streaming services for all passengers except those who subscribe to the same country where the selected POP is located. Thus, for example, if a U.S. based airline selected a U.S. POP device location in order to please most of their passengers, any Canadian and overseas passengers would not be able to use their streaming subscriptions over the provided Internet connection.

This patent document describes exemplary vehicle entertainment systems, apparatus and methods to overcome at least the above described technical drawbacks with conventional vehicle entertainment systems. For example, the techniques described in this patent document enable each passenger to select their respective country to identify the correct geolocation or location of the POP device to support streaming services for Internet content. Furthermore, the techniques described in this patent document can enable each passenger to browse the Internet via websites that may present different languages or content based on the geolocated country (e.g., google.de in Germany, or google.com in U.S., or ebay.co.uk in United Kingdom). One of the benefits of the techniques described in this patent document is that it can accommodate geolocation streaming services and other Internet services.

Figure 1:
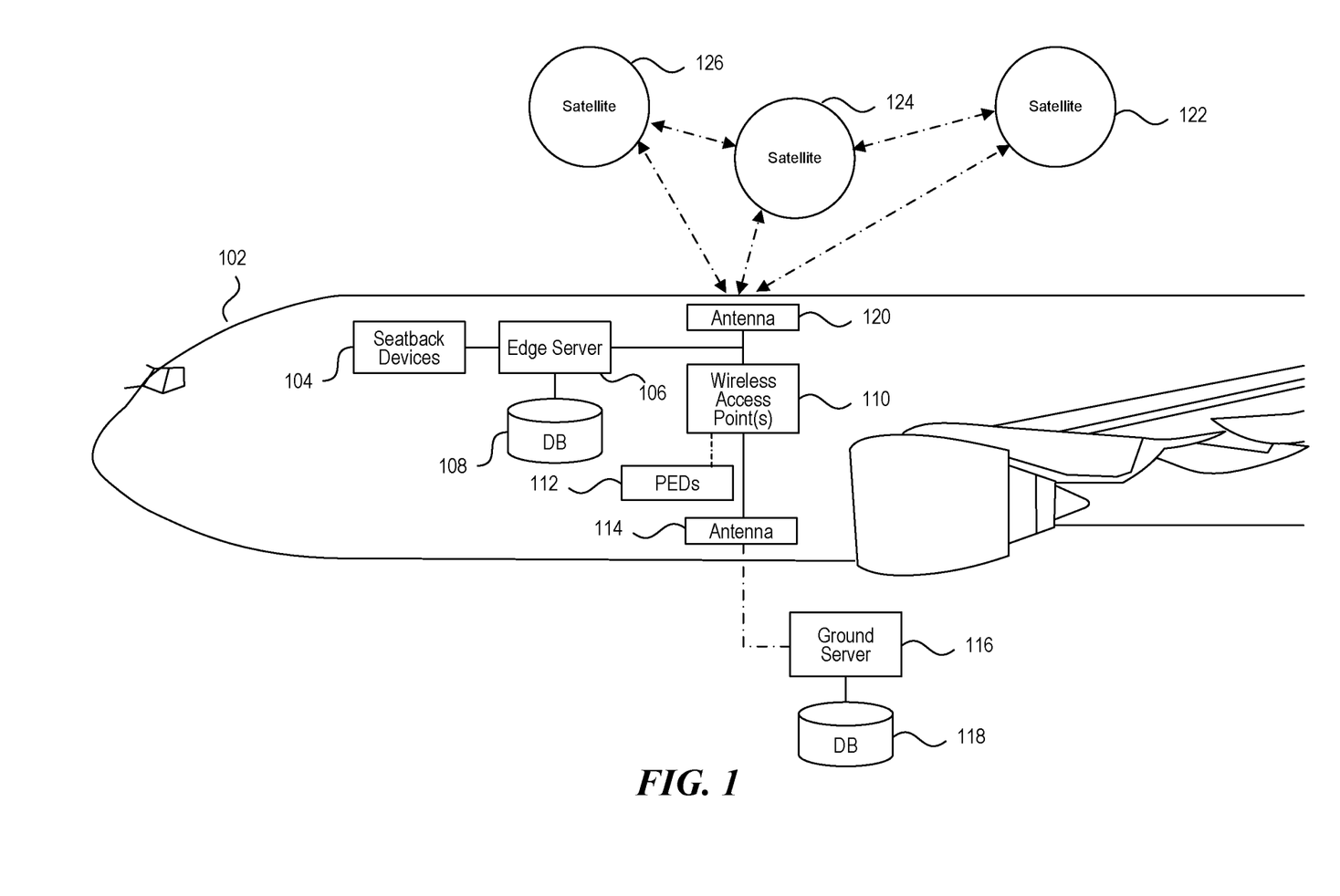
FIG. 1 shows an exemplary vehicle entertainment system installed in an airplane.

FIG. 1 shows an exemplary vehicle entertainment system 100 installed in an airplane 102. The vehicle entertainment system 100 includes an edge server 106 (or head-end server) located in the airplane 102. The edge server 106 is communicably coupled to the seatback devices 104 and PEDs 112 to provide Internet content (e.g., audio, video, image, webpage, etc.,) to the seatback devices 104 and/or PEDs. For example, the edge server 106 includes a content module (shown as 425 in FIG. 4A) that may send Internet contents to seatback devices 104 via an Ethernet switch, and the content module may send Internet contents to PEDs 112 via one or more wireless access points 110. The content module of the edge server 106 can send a list of Internet contents to be displayed on a graphical user interface (GUI) of the seatback devices 104 and/or the PEDs 112. The Internet content may be stored on the edge server or may be streamed from the ground Internet via one or more satellites 122, 124, 126 and/or via a ground server 116. The ground server 116 is a fixed location server on the ground (e.g., ground-based server).

After a user selects a particular Internet content via a seatback device or a PED, the seatback device or PED can send the user's selection information to the content module in the edge server 106, whereupon the content module can send the selected Internet content back to the user's seatback device or PED. A seatback device and/or a PED can be considered a passenger device at least because the seatback device or a PED can display or play the Internet content. The seatback devices 104 and PEDs 112 can include appropriate audio or video codecs stored thereon to play the Internet contents provided by the edge server 102 or another device (e.g., media hard drive) located onboard the airplane 102.

The PEDs 112 can wirelessly communicate with one or more wireless access points 110. Thus, the PEDs 112 can be in communication with the ground server 116 or another server via the wireless access point(s) 110 and the antenna 114. This connection can enable the PEDs to access the Internet even when the airplane 102 is flying and the PEDs do not have cellular connectivity.

Figure 2:
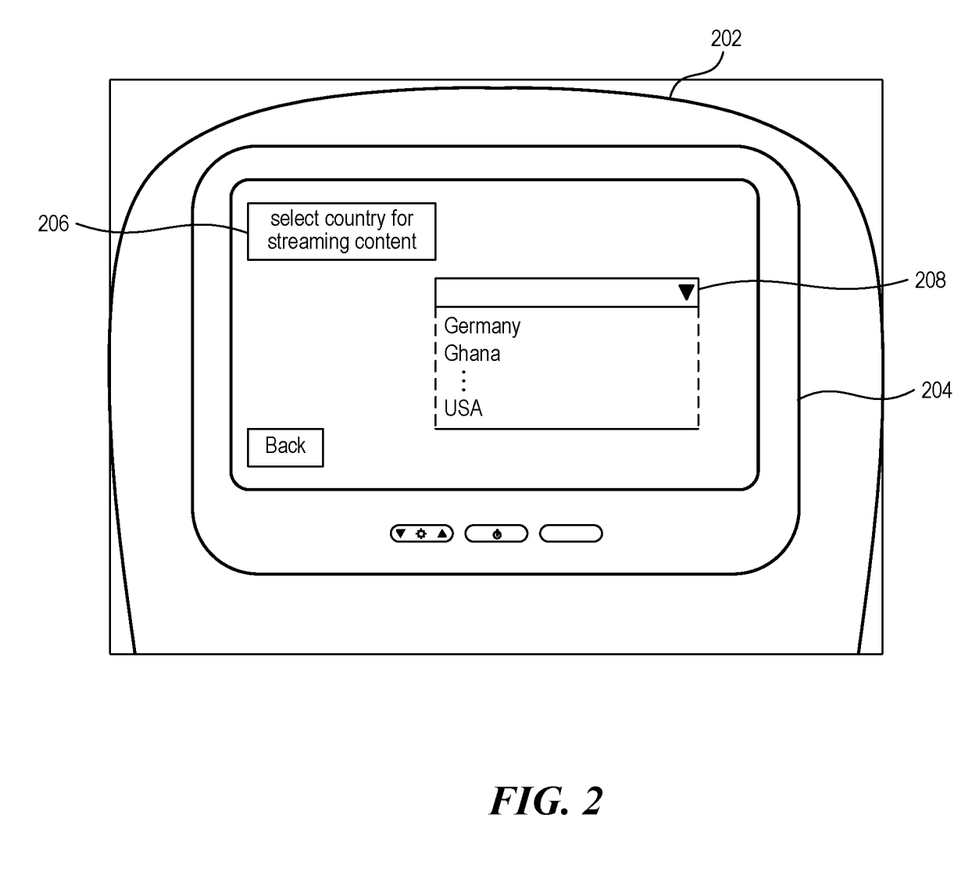
FIG. 2 shows a graphical user interface (GUI) of a seatback device through which a passenger can select a home country.

The passenger module (shown as 430 in FIG. 4A) of the edge server 106 may allow the passengers to stream Internet content from the ground Internet. In an example implementation, as shown in FIG. 2, a GUI of a seatback device 204 on a seat 202 (or a PED) may display an option 206 for a passenger to select a home country so that the passenger can stream Internet content licensed within the selected home country. For example, at the time of one-time sign-up, or within the preferences of a long-term subscriber, the GUI may include a drop-down menu 208 that allows a passenger to select a home country. In some embodiments, the GUI may, in addition to or separately from the list of countries, include another option for the passenger to select the "fastest routing" so that the data traffic associated with seatback device 204 may be routed to a POP device closest to the ground server, which can be determined by the ground server.

When a passenger selects a home country, the seatback device 204 or PED sends the selected home country and an identifier (e.g., IP address) associated with the seatback device 204 or PED to the passenger module of the edge server. The passenger module can store the selected home country along with the identifier of the seatback device 204 or PED in a database (shown as 435 in FIG. 4A) in the edge server so that data traffic to and from the seatback device or PED can be properly routed. By storing the selected home country and the associated identifier of the seatback device or the PED, the content module of the edge server can identify the seatback device or PED to which an Internet content is to be streamed from the ground Internet.

The passenger module can group the data traffic for a passenger with data traffic of other passengers who have selected the same home country. For example, if at least two passengers select Belgium as their home country, then the passenger module can include in an IP packet a unique identifier that can identify the selected home country (e.g., Belgium), where a ground server can send the IP packet to a POP device in the selected home country. Thus, in the above example, the passenger module can logically group data traffic of the at least two Belgian passengers who have selected the same country.

In a first example implementation, the passenger module may setup virtual local area networks (VLANs) with an Ethernet switch or access point where each VLAN is associated with a different selected home country and where each VLAN has a unique identifier. Thus, the unique identifier associated with each VLAN can be included in the IP packet to identify or indicate a selected home country. In a second example implementation, the passenger module can include the unique identifier that indicates that the selected home country in a differentiated services code point (DSCP) field of the IP packet header. In a third example implementation, the passenger can send to a ground server an IP packet comprising a unique identifier that indicates the selected home country (e.g., country code) so that the ground server can route the IP packet to a POP device based on the unique identifier. In the third example implementation, the ground server may store a look-up table in a database (shown as 480 in FIG. 4B) that identifies the POP devices associated with unique identifiers of various home countries.

The passenger module can include in an IP packet a unique identifier that indicates a same home country selected by the one or more passengers. In FIG. 1, the passenger module of the edge server 106 can send the IP packet with the unique identifier to one or more satellites 122, 124, 126 and/or the ground server 116 that can then dynamically route the data traffic data traffic to a POP device located in a home country indicated by the IP packet.

Figure 3:
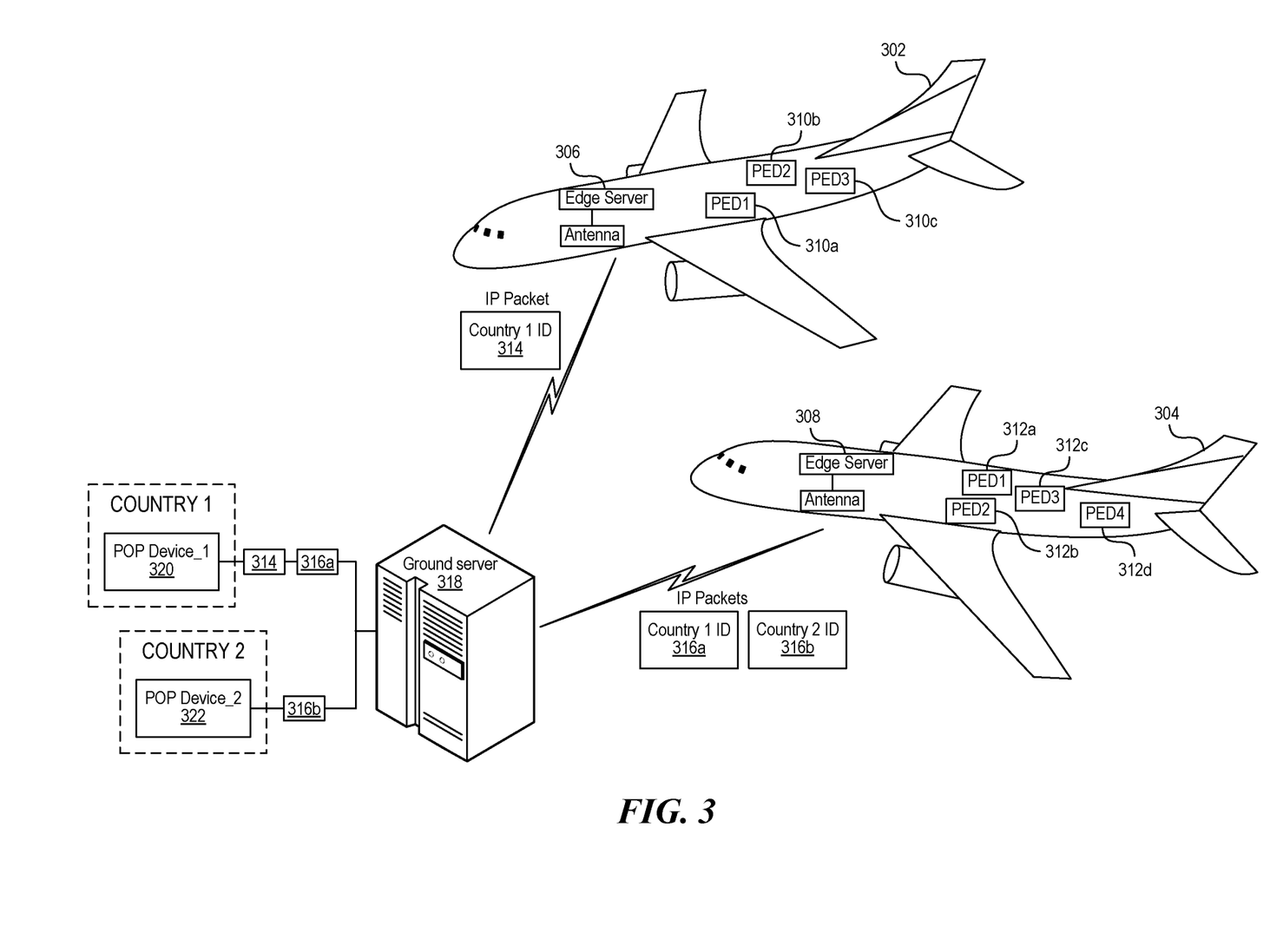
FIG. 3 shows two example scenarios of an edge server grouping data traffic based on countries selected by the passengers.

FIG. 3 shows two example scenarios of an edge server grouping data traffic based on countries selected by the passengers. FIG. 3 shows two airplanes 304, 306 flying where each airplane includes an edge server 306, 308 and a plurality of PEDs 310a-310c, 312a-312d (or seatback devices). In an example, and for ease of explanation, a first set of passengers in airplane 302 use the three PEDs 310a-310c to select a same home country (e.g., country 1), a second set of passengers in airplane 304 use two PEDs 312a-312b to select a same home country (e.g., country 1), and a third set of passengers in airplane 304 use the other two PEDs 312c-312d to select a same home country (e.g., country 2) that is different from the home country selected by the second set of passengers.

In the above example, edge servers 306, 308 can send IP packets 314, 316a, 316b to a ground server 318 (e.g., a fixed location server on the ground), where the IP packets 314, 316a, 316b includes an identifier that that identifies the country to which the IP packets are to be routed. For example, IP packets 314, 316a may include an identifier that is associated with country 1. And, IP packet 316b may include an identifier that is associated with country 2. In some embodiments, as explained in this patent document, the identifier associated with a country may include a VLAN identifier (ID), an ID in DSCP field, or a country code.

The ground server 318 receives the IP packets 314, 316a, 316b and routes the IP packets to the POP devices 320, 322 via the Internet. The ground server 318 includes a routing module (shown as 475 in FIG. 4B) that routes the IP packets 314, 316a, 316b to their destination based on the identifiers in the IP packets. In an example implementation, as explained in this patent document, the routing module may refer to a look-up table stored in a database to identify a POP device (e.g., IP address of POP device) to which the IP packet is to be routed. The lookup table may include multiple rows where each row shows one or more identifiers (e.g., IP address(es)) of one or more POP devices for an identifier associated with a country (e.g., VLAN ID, an ID in DSCP field, or a country code). As shown in FIG. 3, the IP packets 314, 316a are routed to a POP device_1 320 in Country 1 and IP packet 316b is routed to a POP device_2 322 in Country 2.

In some embodiments, the passenger module of the edge server may download a passenger manifest from another server and may determine the home country to which the passengers belong. In such embodiments, the passenger module may limit the passenger's selection so that the passenger module may only allow the GUI of the seatback device to show a single home country associated with the passenger's address. When the passenger selects the single home country via the GUI of a seatback device or a PED, the passenger module can store the selected single home country along with the identifier of the seatback device or PED in a database in the edge server so that data traffic can be properly routed to the selected single home country as described in this patent document.

In some embodiments, the passenger module of the edge server may limit a number of countries selected from a same passenger device so that a same device does not keep selecting different home countries to view content from different regions. As an example, the passenger module of the edge server may limit the number of countries selected from a same passenger device to up to three countries. In this example, if the passenger module determines that a same passenger device has selected its fourth country, the passenger module may send a message to the passenger device indicating that the passenger has reached his or her limit for country selections.

Figure 4A:
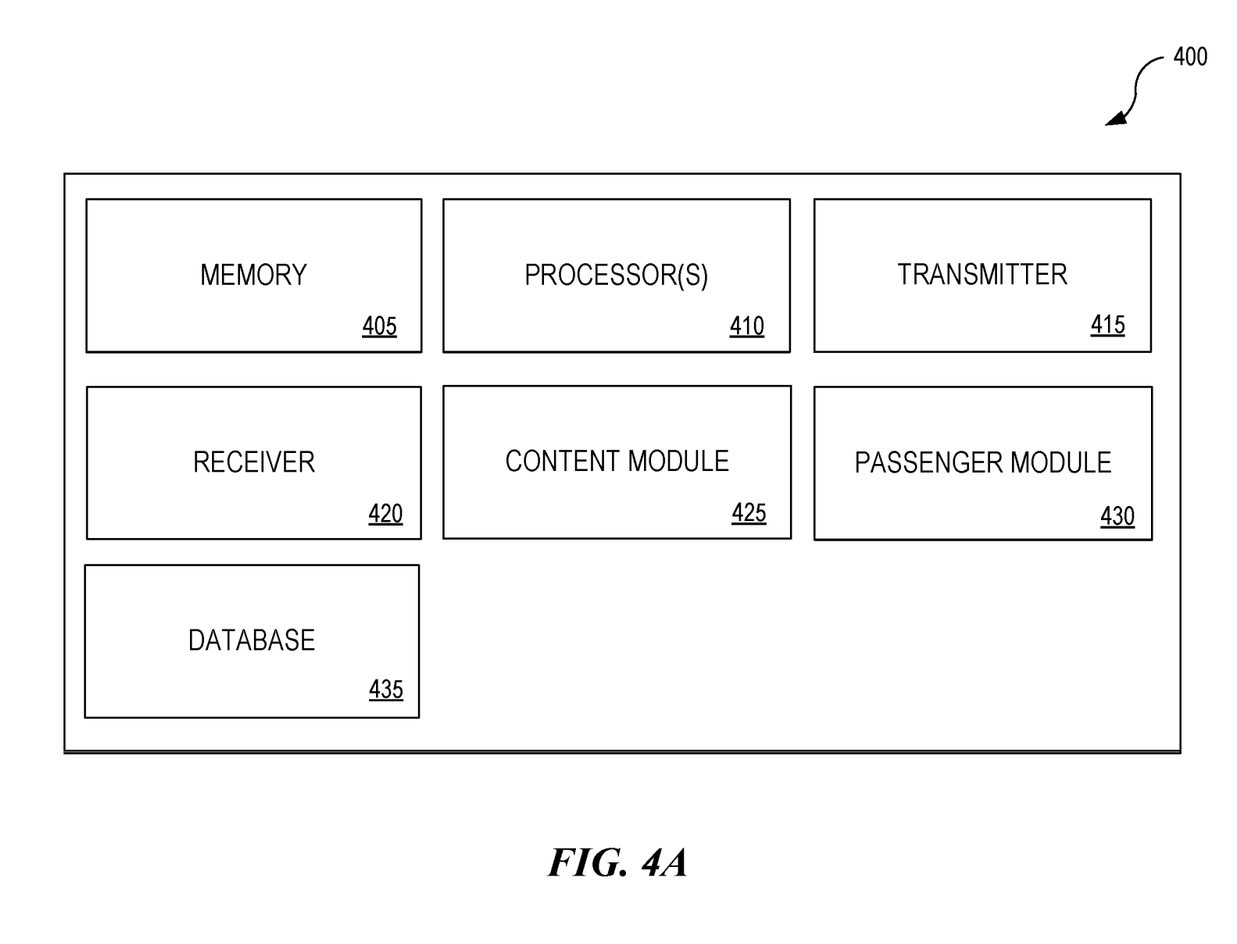
FIG. 4A shows an exemplary block diagram of an edge server that are part of an exemplary vehicle entertainment system.

FIG. 4A shows an exemplary block diagram of an edge server that are part of an exemplary vehicle entertainment system. The edge server 400 includes at least one processor 410 and a memory 405 having instructions stored thereupon. The instructions upon execution by the processor 410 configure the edge server 400 to perform the operations described in FIGS. 1 to 3 and 5, and to perform the operations described for the content module 425, the passenger module 430, and the database 435. The instructions upon execution by the processor 410 can also configure the edge server 400 to perform the operations described for the edge server in the various embodiments described in this patent document. The transmitter 415 transmits or sends information or data to another device (e.g., ground server, seatback devices, or PEDs). The receiver 420 receives information or data transmitted or sent by another device (e.g., ground server, seatback devices, or PEDs).

Figure 4B:
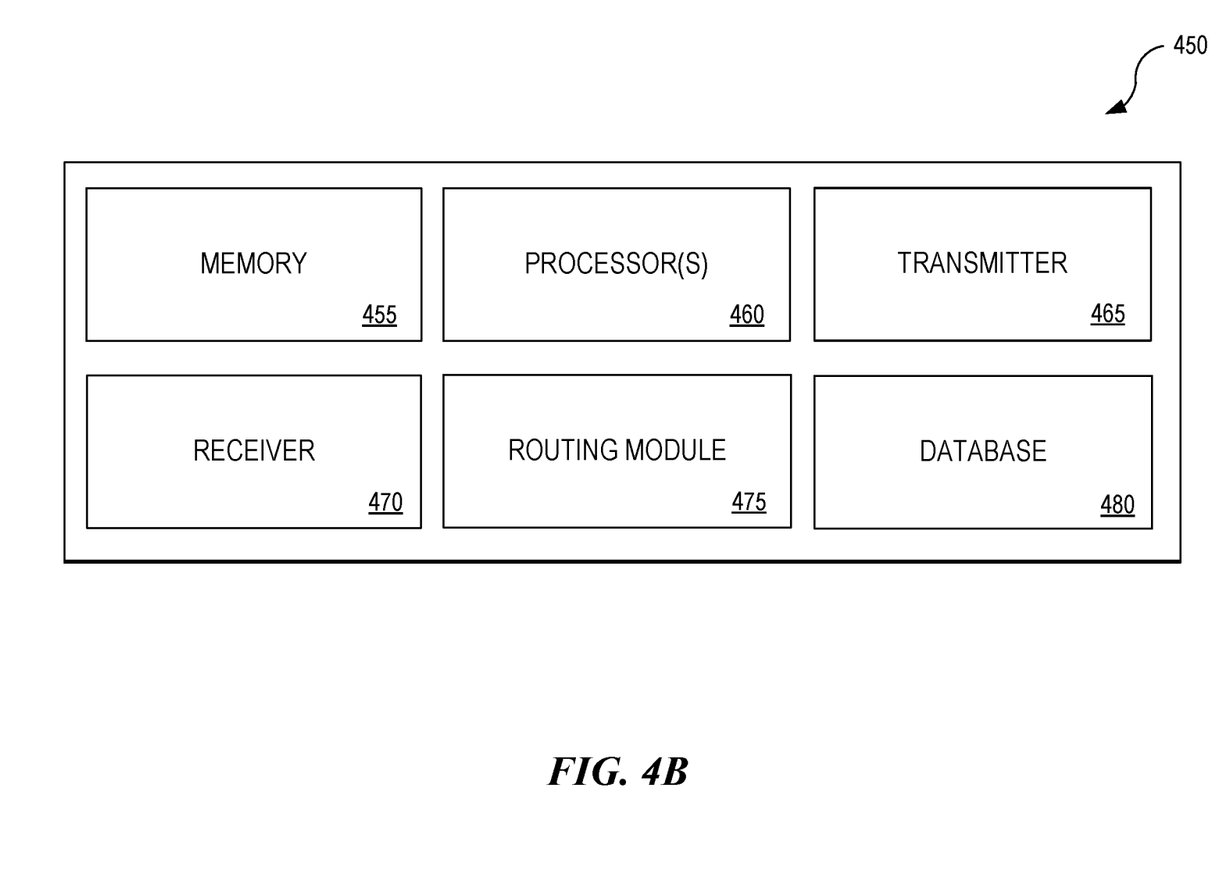
FIG. 4B shows an exemplary block diagram of a ground server that are part of an exemplary vehicle entertainment system.

FIG. 4B shows an exemplary block diagram of a ground server that are part of an exemplary vehicle entertainment system. The ground server 450 includes at least one processor 460 and a memory 455 having instructions stored thereupon. The instructions upon execution by the processor 460 configure the ground server 450 to perform the operations described in FIGS. 1 to 3 and 5, and to perform the operations described for the routing module 475 and the database 480. The instructions upon execution by the processor 460 can also configure the ground server 450 to perform the operations described in the various embodiments described for the ground server in this patent document. The transmitter 465 transmits or sends information or data to another device (e.g., edge server, POP devices). The receiver 470 receives information or data transmitted or sent by another device (e.g., edge server).

Figure 5:
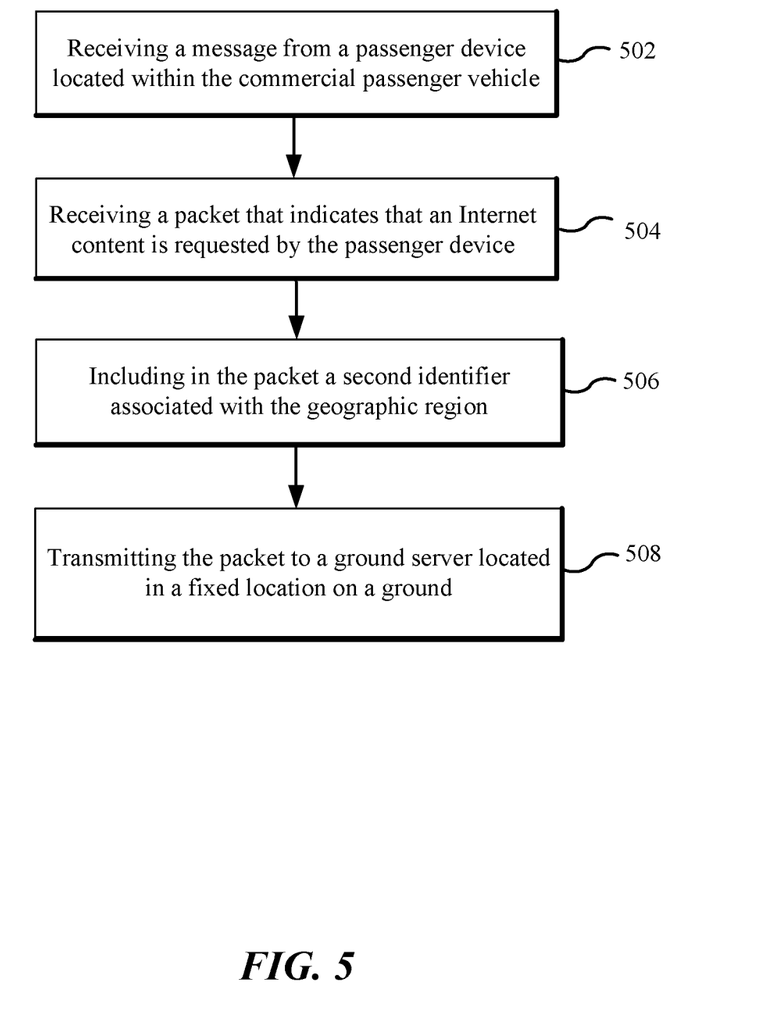
FIG. 5 shows an exemplary flowchart of a method of routing traffic based on geolocation selected by passengers located in a commercial passenger vehicle.

FIG. 5 shows an exemplary flowchart of a method of routing traffic based on geolocation selected by passengers located in a commercial passenger vehicle. Operations 502 to 508 describe a first method performed by an edge server located in the commercial passenger vehicle. At the receiving operation 502, the edge server receives a message from a passenger device located within the commercial passenger vehicle, where the message indicates a geographic region selected via the passenger device.

At the receiving operation 504, the edge server receiving a packet that indicates that an Internet content (e.g., audio, video, website, etc.,) is requested by the passenger device, where the packet comprises a first identifier that identifies the Internet content.

At the including operation 506, the edge server includes in the packet a second identifier associated with the geographic region. At the transmitting operation 508, the edge server transmits the packet to a ground server located in a fixed location on a ground. The ground server is configured to perform a second method by sending the packet to a point of presence (POP) device associated with the geographic region indicated by the second identifier.

In some embodiments, prior to the receiving of the message, the edge server is configured to perform the first method that further comprises receiving a passenger manifest that includes names and addresses of passengers on the commercial passenger vehicle, determining home countries to which the passengers belong based on the addresses of the passengers, and sending a second message to the passenger device, where the second message instruct the passenger device to limit geographic region selection options to the home country to which a passenger operating the passenger device belongs, and where the geographic region indicated in the message is the home country selected via the passenger device.

In some embodiments, the edge server is configured to perform the first method that further comprises determining, after receiving the message, that the passenger device has exceeded a limit for a total number of geographic region selections allowed for the passenger device, in response to the determining that the total number of geographic region selections has been exceeded: transmitting, to the passenger device, a second message that is displayed on the passenger device, where the displayed second message indicates that the limit for the total number of geographic region selections allowed has been exceeded, and where the second message prevents the passenger device to perform additional geographic region selections.

In some embodiments, the edge server is configured to perform the first method that further comprises receiving from the ground server the Internet content and transmitting the Internet content to the passenger device. In some embodiments, the ground server is configured to perform the second method further comprising: determining an identifier of the POP device associated with the geographic region based on the second identifier, where the identifier of the POP device is determined from a database that stores the identifier of the POP device and the second identifier associated with the identifier of the POP device. In some embodiments, the second identifier is included in a header of the packet. In some embodiments, the second identifier is further associated with a virtual local area network (VLAN) operated in the commercial passenger vehicle.

In some embodiments, the geographic region includes a country. In some embodiments, the second identifier is a country code or a geographic region code. In some embodiments, the edge server is configured to perform the first method that further comprises: receiving a second message from a second passenger device that indicates that a passenger selected a fastest routing option, where the fastest routing option configures the ground server to route data associated with the second passenger device of the passenger to a second POP device that is closest to the ground server; receiving a second packet that indicates that a second Internet content is requested by the second passenger device, where the second packet comprises a third identifier that identifies the second Internet content; including in the second packet a fourth identifier associated with the fastest routing option; and transmitting the second packet to a ground server, where the ground server is further configured to perform the second method by sending, based on the fourth identifier, the second packet to the second POP device. In some embodiments, the edge server is configured to perform the first method that further comprises receiving the second Internet content from the ground server and transmitting the second Internet content to the second passenger device.

There are several technical advantages to the vehicle entertainment system described in FIGS. 1 to 5. The technical solution described in FIGS. 1 to 5 can employ a ground server can route traffic to POP devices located in various countries so that such a system can minimize or even eliminate the need for extra severs in various countries to provide geographically licensed Internet content. Another technical benefit of the vehicle entertainment system described in this patent document is that it is not dependent on reverse engineering each Internet content provider's geolocation or streaming sequence. Yet another technical benefit of the exemplary vehicle entertainment system is that it can support geolocation specific shopping or search providers.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for routing packets from commercial passenger vehicle, the system comprising:
   an edge server located in the commercial passenger vehicle, the edge server configured to perform a first method comprising:
      receiving a message from a passenger device located within the commercial passenger vehicle, wherein the message indicates a geographic region selected via the passenger device;
      receiving a packet that indicates that an Internet content is requested by the passenger device, wherein the packet comprises a first identifier that identifies the Internet content;
      including in the packet a second identifier associated with the geographic region;
      transmitting the packet to a ground server located in a fixed location on a ground, wherein the ground server is configured to perform a second method by sending the packet to a point of presence (POP) device associated with the geographic region indicated by the second identifier;
      receiving a second message from a second passenger device that indicates that a passenger selected a fastest routing option, wherein the fastest routing option configures the ground server to route data associated with the second passenger device of the passenger to a second POP device that is closest to the ground server;
      receiving a second packet that indicates that a second Internet content is requested by the second passenger device, wherein the second packet comprises a third identifier that identifies the second Internet content;
      including in the second packet a fourth identifier associated with the fastest routing option; and
      transmitting the second packet to the ground server, wherein the ground server is further configured to perform the second method by sending, based on the fourth identifier, the second packet to the second POP device.

2. The system of claim 1, wherein prior to the receiving of the message, the edge server is configured to perform the first method that further comprises:
   receiving a passenger manifest that includes names and addresses of passengers on the commercial passenger vehicle;
   determining home countries to which the passengers belong based on the addresses of the passengers; and
   sending a third message to the passenger device, wherein the second third message instruct the passenger device to limit geographic region selection options to the home country to which a passenger operating the passenger device belongs, and wherein the geographic region indicated in the message is the home country selected via the passenger device.

3. The system of claim 1, wherein the edge server is configured to perform the first method that further comprises:
  determining, after receiving the message, that the passenger device has exceeded a limit for a total number of geographic region selections allowed for the passenger device;
  in response to the determining that the total number of geographic region selections has been exceeded:
    transmitting, to the passenger device, a third message to be displayed on the passenger device, wherein the third message indicates that the limit for the total number of geographic region selections allowed has been exceeded, and wherein the third message prevents the passenger device to perform additional geographic region selections.

4. The system of claim 1, wherein the edge server is configured to perform the first method that further comprises:
  receiving from the ground server the Internet content; and
  transmitting the Internet content to the passenger device.

5. The system of claim 1, wherein the ground server is configured to perform the second method further comprising:
  determining an identifier of the POP device associated with the geographic region based on the second identifier, wherein the identifier of the POP device is determined from a database that stores the identifier of the POP device and the second identifier associated with the identifier of the POP device.

6. The system of claim 1, wherein the second identifier is included in a header of the packet.

7. The system of claim 1, wherein the second identifier is further associated with a virtual local area network (VLAN) operated in the commercial passenger vehicle.

8. The system of claim 1, wherein the geographic region includes a country.

9. The system of claim 1, wherein the second identifier is a country code or a geographic region code.

10. The system of claim 1, wherein the edge server is configured to perform the first method that further comprises:
  receiving the second Internet content from the ground server; and
  transmitting the second Internet content to the second passenger device.

11. A method implemented by an edge server in a commercial passenger vehicle, comprising:
  receiving a message from a passenger device located within the commercial passenger vehicle, wherein the message indicates a geographic region selected via the passenger device;
  receiving a packet that indicates that an Internet content is requested by the passenger device, wherein the packet comprises a first identifier that identifies the Internet content;
  including in the packet a second identifier associated with the geographic region;
  transmitting the packet to a ground server located in a fixed location on a ground, wherein the ground server is configured to send the packet to a point of presence (POP) device associated with the geographic region indicated by the second identifier;
  determining, after receiving the message, that the passenger device has exceeded a limit for a total number of geographic region selections allowed for the passenger device;
  in response to the determining that the total number of geographic region selections has been exceeded:
    transmitting, to the passenger device, a second message to be displayed on the passenger device, wherein the second message indicates that the limit for the total number of geographic region selections allowed has been exceeded, and wherein the second message prevents the passenger device to perform additional geographic region selections.

12. The method of claim 11, wherein prior to the receiving of the message, the method further comprises:
  receiving a passenger manifest that includes names and addresses of passengers on the commercial passenger vehicle;
  determining home countries to which the passengers belong based on the addresses of the passengers; and
  sending a third message to the passenger device, wherein the third message instruct the passenger device to limit geographic region selection options to the home country to which a passenger operating the passenger device belongs, and wherein the geographic region indicated in the message is the home country selected via the passenger device.

13. The method of claim 11, further comprising:
  receiving from the ground server the Internet content; and
  transmitting the Internet content to the passenger device.

14. The method of claim 11, wherein the second identifier is included in a header of the packet.

15. The method of claim 11, wherein the second identifier is further associated with a virtual local area network (VLAN) operated in the commercial passenger vehicle.

16. The method of claim 11, wherein the geographic region includes a country.

17. The method of claim 11, wherein the second identifier is a country code or a geographic region code.

18. An edge server comprising a processor and a memory, the edge server implemented in a commercial passenger vehicle and configured to perform a method, the method comprising:
  receiving a message from a passenger device located within the commercial passenger vehicle, wherein the message indicates a geographic region selected via the passenger device;
  receiving a packet that indicates that an Internet content is requested by the passenger device, wherein the packet comprises a first identifier that identifies the Internet content;
  including in the packet a second identifier associated with the geographic region;
  transmitting the packet to a ground server located in a fixed location on a ground, wherein the ground server is configured to send the packet to a point of presence (POP) device associated with the geographic region indicated by the second identifier;
  determining, after receiving the message, that the passenger device has exceeded a limit for a total number of geographic region selections allowed for the passenger device;
  in response to the determining that the total number of geographic region selections has been exceeded:
    transmitting, to the passenger device, a second message to be displayed on the passenger device, wherein the second message indicates that the limit for the total number of geographic region selections allowed has been exceeded, and wherein the second message prevents the passenger device to perform additional geographic region selections.

19. The edge server of claim 18, wherein prior to the receiving of the message, the processor of the edge server is configured to perform the method that further comprises:
receiving a passenger manifest that includes names and addresses of passengers on the commercial passenger vehicle;
determining home countries to which the passengers belong based on the addresses of the passengers; and
sending a third message to the passenger device, wherein the third message instruct the passenger device to limit geographic region selection options to the home country to which a passenger operating the passenger device belongs, and wherein the geographic region indicated in the message is the home country selected via the passenger device.

20. The edge server of claim 18, wherein the processor of the edge server is configured to perform the method that further comprises:
receiving a third message from a second passenger device that indicates that a passenger selected a fastest routing option, wherein the fastest routing option configures the ground server to route data associated with the second passenger device of the passenger to a second POP device that is closest to the ground server;
receiving a second packet that indicates that a second Internet content is requested by the second passenger device, wherein the second packet comprises a third identifier that identifies the second Internet content;
including in the second packet a fourth identifier associated with the fastest routing option; and
transmitting the second packet to the ground server to send the second packet to the second POP device.

* * * * *